United States Patent [19]

Cowen, III

[11] E Re. 30,138

[45] Reissued Nov. 6, 1979

[54] COMBINED CARRYING BAG AND RACKET CARRIER

[76] Inventor: Arthur T. Cowen, III, 20 W. 75th St., New York, N.Y. 10023

[21] Appl. No.: 829,300

[22] Filed: Aug. 31, 1977

Related U.S. Patent Documents

Reissue of:

[64] Patent No.: 3,963,103
Issued: Jun. 15, 1976
Appl. No.: 539,332
Filed: Jan. 8, 1975

[51] Int. Cl.[2] ..... A45C 3/00

[52] U.S. Cl. ..... 190/52; 150/52 G; 224/46 R

[58] Field of Search ..... 190/48, 41 Z, 42, 52; 150/1.5, 52 G, 28 R, 33; 273/73; 224/46 R, 9; D87/1 R

[56] References Cited

U.S. PATENT DOCUMENTS

| | | | |
|---|---|---|---|
| D. 223,424 | 4/1972 | Glantz | D87/1 R |
| D. 249,594 | 9/1978 | Stewart | D87/1 R |
| 1,367,574 | 2/1921 | White | 190/52 |
| 1,575,875 | 3/1926 | Szewczyk | 190/52 |
| 2,131,583 | 9/1938 | Crotty | 190/52 |
| 2,418,589 | 4/1947 | Lifton | 190/52 |
| 2,495,391 | 1/1950 | Smith | 190/48 |
| 2,552,438 | 5/1951 | Kramer | 190/52 |
| 2,609,897 | 9/1952 | Meyer | 190/52 |
| 3,122,225 | 2/1964 | Ward | 190/52 |
| 3,316,951 | 5/1967 | Jacobson | 150/52 G |
| 3,346,155 | 10/1967 | Oechsle | 150/33 |
| 3,622,056 | 11/1971 | Droeger | 190/52 |
| 3,802,613 | 4/1974 | Droeger | 150/33 |
| 3,830,348 | 8/1974 | Ohyama | 190/52 |
| 4,081,061 | 3/1978 | Tucker | 190/52 |

FOREIGN PATENT DOCUMENTS

| | | | |
|---|---|---|---|
| 1080660 | 12/1954 | France | 190/52 |

*Primary Examiner*—R. E. Hart
*Attorney, Agent, or Firm*—Mandeville and Schweitzer

[57] ABSTRACT

The disclosure is directed to a combination carrying case and racket carrier useful particularly for carrying the clothing and equipment for racket sports, such as tennis, squash, badminton, etc. The combined article includes a racket case which is separate from but secured permanently to a bag-like section utilized in carrying clothing and other equipment related to the particular racket sport. As a unique feature, the racket case is proportioned to receive closely the head portion of the racket, permitting the handle to be exposed, and it includes a novel closure arrangement which enables the outwardly projecting racket handle to be oriented in any of several desired positions relative to the carrying facilities of the combined bag. Typically, the angular orientation of the racket handle may vary over a range of around 90°. In conjunction with the adjustable orientation feature for the racket handle, the carrying bag incorporates multiple carrying features, including a conventional handle grip, a strap for over the shoulder carrying, and facilities enabling the strap to be utilized to form a back pack. The adjustable racket orientation enables these various carrying modes to be utilized conveniently and with optimum comfort. In addition, the adjustable orientation facilitates carrying of the loaded bag in close quarters (e.g., elevators, subways, etc.) and enables the bag load to be symmetrically distributed, so that a bag of small, narrow configuration can nevertheless be self standing.

8 Claims, 9 Drawing Figures

FIG. 1
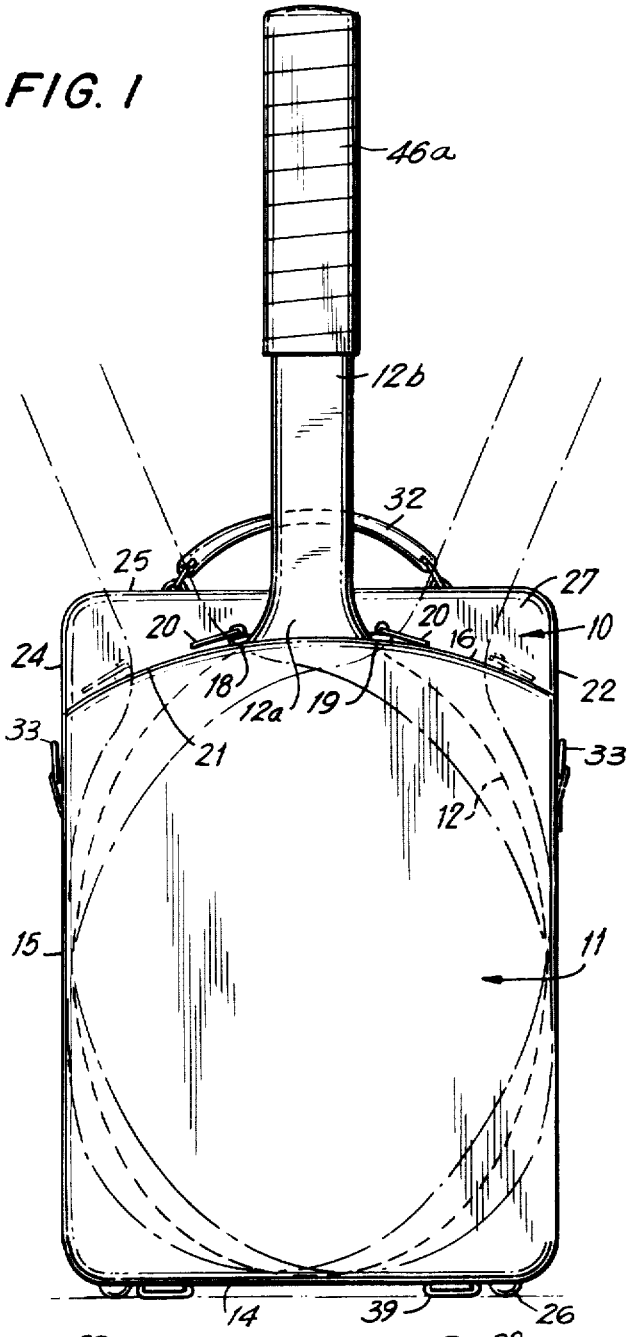
FIG. 2
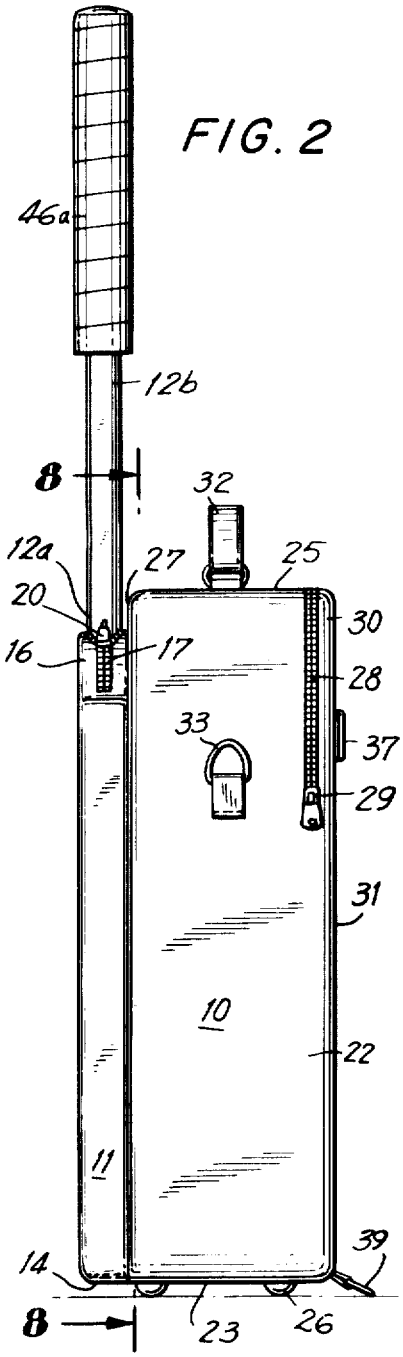
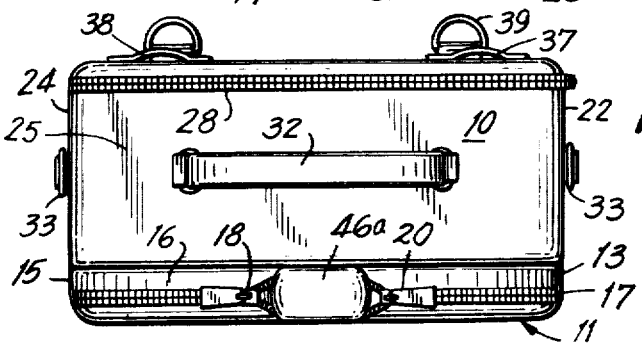
FIG. 3

COMBINED CARRYING BAG AND RACKET CARRIER

Matter enclosed in heavy brackets [ ] appears in the original patent but forms no part of this reissue specification; matter printed in italics indicates the additions made by reissue.

DESCRIPTION OF PRIOR ART

Combined carrying cases for transporting the clothing and equipment of racket sports are, in general, well known. Typical examples of known constructions are reflected in the Haynes U.S. Pat. No. 2,767,758 and in the Glantz et al U.S. Pat. No. Des. 223,424. The Haynes patent reflects a first common type of carrying bag, wherein the entire racket is housed within a relatively elongated carrying case. The case is necessarily of relatively elongated configuration, in order to completely house the racket handle. A somewhat more conventional type of combined carrier is reflected in the Glantz et al patent in which a racket head cover is sewn or otherwise secured to the side of an otherwise more or less conventional bag. When the racket head is zipped into the cover, it is held to the side of the carrying bag, with its handle projecting obliquely, tilted upwardly at an angle of, say, 30° or so from the horizontal. There are, of course, many variations in the styling of carriers of the general type reflected by the foregoing patents. However, insofar as the art is known, these two patents appear to be generally representative of the significant mechanical principles incorporated into the carrying bags which are currently available.

BACKGROUND AND SUMMARY OF INVENTION

In accordance with the present invention, a novel and improved combination carrier is provided in which multiple carrying features are provided and in which the racket carrier includes means for adjustably orienting the direction in which the exposed racket handle extends. This enables the racket orientation to be adjusted to most conveniently suit the carrying mode, whether hand held, over the shoulder, or back pack. The adjustable racket orientation provided by the racket carrying portion of the bag also enables the bag to be conveniently carried and set down in crowded or confined areas, and also enables the bag to be constructed so as to be free standing when loaded, while occupying a practical minimum of space.

In a typical and advantageous embodiment of the invention, the combined bag is formed of two adjacent, secured-together sections, one for the racket head and one for retaining shoes, clothing and other equipment. The case for the racket head ideally has dimensions closely conforming to the size of the racket head, at least in terms of width and overall height. The width of the clothing case portion may advantageously be approximately the same as that of the racket case, and of suitable width and height for conveniently accepting a typical set of tennis togs, including shoes and a can of balls, for example.

In accordance with the invention, the racket case portion includes novel closure arrangements at the top of the case, which enclose the racket in the throat area, to hold it in its case and, in addition, serve to support the throat of the racket in various positions, with the projecting handle of the racket in various angular orientations. To particular advantage, the closure means may be in the form of a double zipper, where the zipper slides being movable in zipper closing directions (toward each other) from opposite ends, to close upon the throat of the racket from opposite sides and hold the racket handle in any predetermined position within the range accommodated by the closure. Typically and advantageously, this may be any position from vertical to around 45° to either side of vertical.

In combination with the adjustable racket orientation, the combination carrying case of the invention includes facilities for carrying the case either by hand grip, a shoulder strap, or a back pack arrangement.

In its various carrying modes, the new carrying case generally is held in a common orientation. However, the desired orientation of the racket handle may be different when the bag is carried over the shoulder than when the bag is carried by its hand grip, and may be different still when the bag is carried as a back pack. Likewise, whatever the previous orientation used for carrying, it may be desirable to lock the racket head in a vertical orientation to enable the bag conveniently to be set down in a crowded area. In the latter case, it may be convenient to grip, and even temporarily carry, the case by the racket handle itself.

As will appear, the features of the invention enable a combination carrier to be produced, for holding racket sport equipment, which provides for highly efficient carrying of the necessary equipment in a carrier of minimum overall size. The carrier also permits wide variety in adjustment in carrying mode, to the maximum convenience of the individual carrier under a variety of circumstances and conditions.

For a more complete understanding of the above and other features and advantages of the invention, reference should be made to the following detailed description of a preferred embodiment of the invention and to the accompanying drawings.

DESCRIPTION OF THE DRAWINGS

FIG. 1 is a front elevational view of a racket sport carrying case constructed in accordance with the principles of the invention, illustrating the manner in which a racket is held in various angular orientations.

FIGS. 2 and 3 are side elevational and top plan views, respectively, of the carrier of FIG. 1.

DESCRIPTION OF PREFERRED EMBODIMENT OF THE INVENTION

Figure 4:
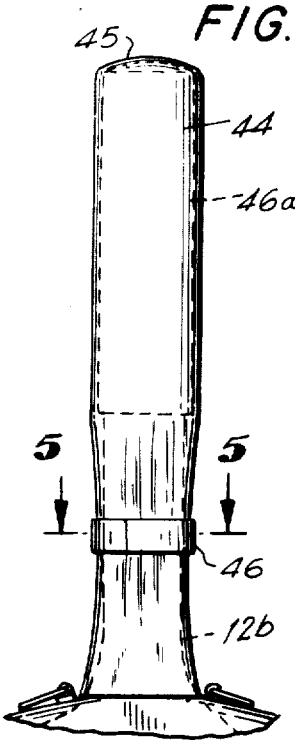
FIG. 4 is a fragmentary view illustrating a removable racket handle cover, which may optionally be utilized with the carrier of FIG. 1.
Figure 5:
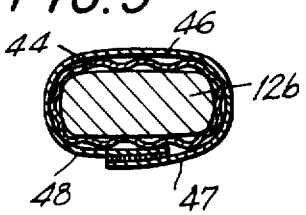
FIG. 5 is an enlarged cross sectional view taken on line 5—5 of FIG. 4.

Referring now to the drawing, the combination carrier of the invention includes, generally, an equipment carrying case 10 and a racket case 11. Typically and advantageously, the carrier may be constructed of a suitable grade of fabric or plastic material of a light, flexible nature, such as is frequently utilized in the manufacture of light luggage articles, such as tote bags, for example. The use of rigid materials, while not in principle outside the scope of the invention, is unnecessary and possibly disadvantageous.

As reflected in FIG. 1, the racket case 11 has width, height and thickness dimensions generally corresponding to those of the head portion 12 of a racket. Thus, in a typical embodiment intended particularly for tennis racket and equipment, the racket case may have an overall width of 10–11 inches, an overall height of 13–14 inches, and a thickness of around an inch, preferably somewhat more than an inch at the top, somewhat less at the bottom. This enables the racket head to be closely yet completely received within the racket case section 11, as desired.

Since, pursuant to the invention, the racket case 11 must accommodate the racket in a variety of angular orientations, the side and bottom wall areas 13–15 should not conform tightly to the configuration of the racket, in order to permit the desired movement of the racket head within its pocket. This is particularly true of a tennis racket, for example, because of the somewhat oblong configuration of the racket head. In this connection, it is convenient and economical simply to make the bottom and side walls 13–15 of the racket case coincide generally with the corresponding walls of the equipment case 10, which desirably may be of rectangular general configuration.

The top wall 16 of the racket case section is provided with closure means 17 extending from one side to the other of the case and enabling the top of the pocket-like racket case to be either fully opened or fully closed. To special advantage, and as one of the specific features of the invention, the closure means 17 is in the form of a zipper or similar slide fastener operated by a pair of opposed slide elements 18, 19. When the slide elements 18, 19 are moved to the opposite extremities of the zipper track, the pocket-like racket case 11 is fully open at the top, for easy insertion or withdrawal of the racket head 12. The racket is then locked securely in the racket case 11 by closing the two zipper slides down upon the throat 12a of the racket, as indicated in FIG. 1.

As will more fully appear, various angular orientations of the racket handle 12b may be preferred in connection with various carrying and/or storage modes of the case. To this end, the racket handle may be moved to any desired orientation and the zipper slides 18, 19 then closed down upon the racket throat 12a in its adjusted position. Although generally not considered necessary, it may be desirable and advantageous to utilize self locking zipper slides in connection with the racket case closure 17. Such self locking zipper slides are well known and commercially available, typically including small lugs (not shown) carried by the gripping levers 20 of the zipper slides. When the slides have been moved to the desired positions, the gripping levers are pressed toward the zipper track, and the lugs penetrate the tracks to block the slides against movement. Merely lifting a gripping lever 20, when it is normally engaged by the fingers for movement, releases the lugs and permits the slide to be moved freely, as desired.

To best advantage, the length of the closure track 17 is such, in relation to the geometry of the racket head 12 and the racket case 11, as to accommodate an overall range of adjustment on the order of 90°. This has been indicated to be adequate to satisfy the conveniences of a typical user of the carrier in any of its various carrying or storage modes.

As reflected in FIG. 1, the contour of the top wall 21 of the racket case 11 is more or less in the form of an arc of long radius. Although precision in the configuration of the top wall is certainly not a significant factor, the general approach to the contouring of the top of the racket case is such that, in any angular orientation of the racket, the zipper track will intersect with the racket throat in approximately the same area. As will be appreciated, if an arc of substantially shorter radius is utilized, the exposed throat width may be greater than desired when the racket is in either of its limit positions away from the vertical. Extending the top wall 21 horizontally, straight across the top of the racket pocket might be functionally adequate, particularly if the zipper track were extended downward slightly along the side walls, but this would be considered as a less than optimum design. Of course, the top wall does not have to be a precise arc of any kind, and a gabled configuration doubtless would be satisfactory, with the top wall angling downward from the center along lines approximating chords of the arc 21, extending from the center to the edge. Thus, as an ideal configuration, from which considerable latitude may be accommodated within the teachings of the invention, the configuration of the top wall 21 could be an arc whose center is at or perhaps below the bottom wall 14 of the racket case.

To advantage, the clothing and equipment case 10, forming part of the combined carrier, has an overall width dimension approximating the width of the racket case 11, that is, in the range of 10 to 11 inches. The invention does not, of course, require this, but the various advantageous features of the invention permit the clothing case 10 to be of this relatively narrow width, for convenient carrying and storage, while at the same time accommodating all the clothes and equipment typically utilized in conjunction with the racket sport. Typically, the clothes case 10 is somewhat higher than the racket case, and typical dimensions may be on the order of 14–15 inches in height. The side, bottom and top walls 22–25 may be of such a width as to give the clothing case a thickness dimension on the order of 4½–5 inches. Two rectangular frames 14–15 inches by 10–11 inches (not shown) made of small diameter wire springs or metal wires may be sewn into the edges of the vertical panels of the clothing bag to provide a framework of support. Suitable stiffening (not shown) may be provided to reinforce the bottom wall 23 and maintain it relatively stiff and flat. This stiffening may be removable thus allowing the empty bag to be compressed. Likewise, it may be convenient to provide foot lugs 26 in the bottom wall to support the carrier slightly above the floor when it is set down or stored.

As will be appreciated, the front wall 27 of the clothing case 10 may also form the back wall of the racket case 11.

To advantage, the clothing carrier 10 is provided with a sliding closure 28, which may be a conventional zipper. A single zipper slide 29 is generally adequate for this closure and, although a double zipper slide could be utilized, it would not form an operative part of the invention to use a double slide. Desirably, the zipper track 28 extends down along the side walls 22, 24 several inches, forming a relatively large access flap 30 in the upper part of the back wall panel 31. This provides access to the interior of the carrying case, as will be readily understood.

For carrying the case, several carrying modes are provided for. Thus, a handle grip 32 is secured in a conventional manner in the center area of the upper wall 25 of the clothing case. The front to back location of the handle can be determined empirically to provide optimum balance of the combined case when loaded with a racket and other gear.

Figure 6:
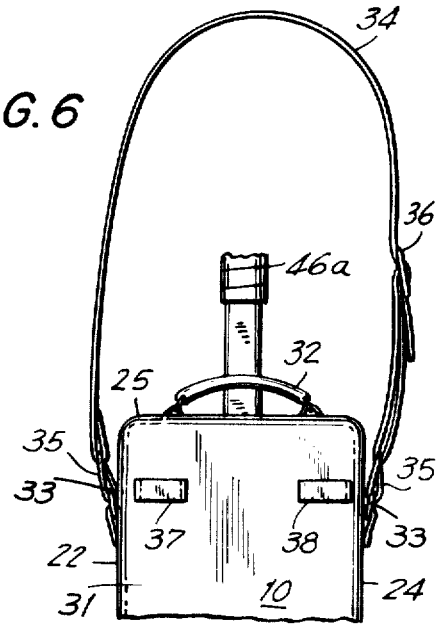
FIG. 6 is a fragmentary back elevational view of the carrier of FIG. 1, showing the carrier with a removable shoulder strap attached thereto for the over the shoulder carrying mode.
Figure 8:
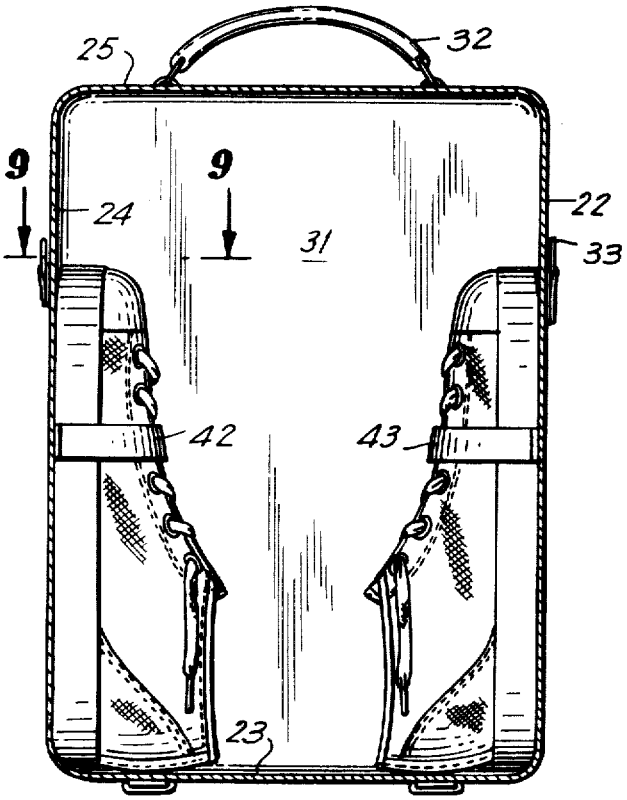
FIG. 8 is a cross sectional view, as taken generally on line 8—8 of FIG. 2, illustrating optional provisions in the bag for conveniently holding a pair of tennis shoes.
Figure 7:
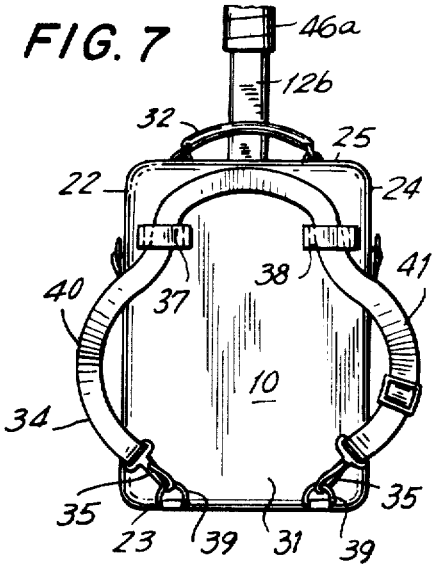
FIG. 7 is another fragmentary back elevational view of the carrier of FIG. 1, shown with the carrying strap, used as a shoulder strap in FIG. 6, reconnected for use of the carrier in a back pack mode.
Figure 9:
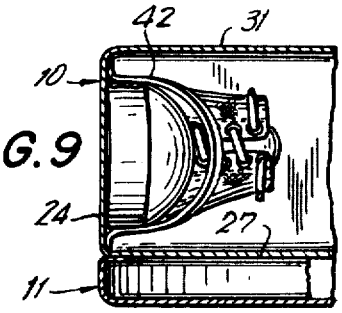
FIG. 9 is a fragmentary cross sectional view taken generally on line 9—9 FIG. 8.

In addition to the hand grip 32, the bag is provided, on the side walls 22, 24, with attachment rings 33 for a shoulder carrying strap 34 (see FIG. 6). The carrying strap 34 advantageously is provided at both ends with snap connectors 35, and is provided intermediate its ends with an adjusting buckle 36. When carrying the bag in an over the shoulder mode, the carrying strap 34 may be connected to the rings 33 and adjusted to appropriate length for comfortable shoulder carrying. The racket handle orientation, for the shoulder carrying mode, might conveniently be angled somewhat ahead or behind, but probably would not be vertical.

For carrying by the hand grip 32, some persons might find it convenient to have the racket handle in vertical orientation, although probably a somewhat backwardly tilted orientation would be preferred. When the carrier is lifted by the hand grip 32, it may be convenient to disconnect the shoulder strap 34 and store it within the clothing case 10.

For a back pack carrying mode, the shoulder strap 34 has its ends threaded through a pair of sewed-on loops 37, 38 (FIG. 6) secured to the back wall panel 31, in the upper portion thereof and near the sides. After being threaded through the loops 37, 38, the snap fasteners 35 are attached to connecting rings 39 secured adjacent the bottom, back corner edge of the clothing case 10. The sewed on loops 37, 38 desirably fit the strap 34 relatively snugly, enabling the strap to be drawn through the loops to form shoulder encircling portions 40, 41. For the back pack carrying mode, the racket handle 12b generally is locked in a vertical orientation.

The arrangement of the inside of the clothing case 10 is largely a matter of individual option. As will be readily appreciated, a variety of dividers and/or pockets may be provided for special articles, as a function of customer preferences, pricing range of the article, etc. A particularly advantageous internal feature, for the purposes of this invention, is the provision of a pair of elastic bands 42, 43, secured to the edges of the side wall panels 22, 24. The location of the elastic bands 42, 43 is such that, with a typical tennis shoe supported with the back of its heel resting on the bottom panel 23, the band encircles an instep portion of the shoe. Supporting the shoes in this manner improves the distribution of weight in the carrier and also tends to improve its shape, for more convenient carrying and/or storage in any of its modes.

In some cases, it may be desirable to cover the handled portion, as well as the head of the racket. For such cases, it may be advantageous to provide a tubular cover member 44, which is closed at one end 45 and open at the other end for reception over the racket handle. At its open end, the handle cover 44 is encircled by a strap 46 having free end flaps 47, 48 provided with a self-adhering material, such as Velcro. The band 46 is located so as to be at least somewhat below the handle grip portion 46 of the racket handle 12b so that, when the strap is tightened and secured, the tubular cover is effectively locked in place.

The combined carrier of the invention provides for optimum efficiency and convience in the carrying of racket and equipment for typical racket sports, such as tennis, squash, etc. The clothing case portion of the combined carrier may, because of the adjustable orientation of the racket, be of an efficiently small size and of a desirable configuration for carrying in any of hand, over the shoulder or back pack modes, and also for setting down on the floor or storing. The invention is based in part upon the observation that there is no one racket orientation that is optimum for all circumstances. For example, the conventional, nearly horizontal orientation most commonly found in commercially available carriers is all together unsuited for carrying in close quarters such as elevators, public conveyances and the like. Nor is it at all suited for the back pack carrying mode, where that is desired. The combination carrier of the invention, in conjunction with providing for a plurality of carrying modes, provides a unique yet practical arrangement for accommodating various angular orientations of the racket handle to suit the various carrying modes. In addition, the adjustable orientation of the racket handle, provides for maximum convenience to the user for any particular carrying mode selected, by enabling the racket handle position to be adjusted to suit the individual desires and physiques of the user.

A basic, advantageous feature of the invention resides in the use of an adjustably positionable closure for the top of the racket case portion, enabling the top of the racket case to be closed down, around or near the throat area of the racket, to hold the handle in a desired orientation including vertical or any angle up to, say, 45° from the vertical, either forward or backward.

A combined racket and clothing carrier according to the invention, including its many novel and highly advantageous features, may nevertheless be manufactured at a cost entirely competitive with conventional, less convenient and less efficient carriers. Thus, the basic materials and components are inexpensive and largely similar to those of conventional carriers. The important difference lies in the geometry of the racket case and its closure and the combination therewith of the provisions for a plurality of carrying modes.

It should be understood, of course, that the specific forms of the invention herein illustrated and described are intended to be representative only, as certain changes may be made therein without departing from the clear teachings of the disclosure. Accordingly, reference should be made to the following appended claim in determining the full scope of the invention.

I claim:

1. A combination carrier for a racket and associated clothing equipment, which comprises a. a clothing case, b. a rectangular racket case secured to and extending from one side of said clothing case, c. said racket case being substantially in the form of an open top pocket having width dimensions generally corresponding to the width of a racket head to be carried therein, and having a height dimension sufficient to accommodate the racket at least up to its throat area said pocket having a top opening side arranged in the form of an arc whose center of radius is near the bottom of the pocket, d. closure means for said open top side of said racket case to engage and support both sides of said throat area of the racket, e. said closure means being adjustable along substantially the entire length of said top open side to provide, upon closure, support for the racket to hold it in any one of various angular orientations, and f. means for carrying said carrier in an upright position.

2. The combination carrying case of claim 1, further characterized by a. said closure means comprising a double element slide fastener b. the closure elements of said slide fastener being movable in a closing direction toward the handle of a racket received in said racket case and serving, in the case closing positions, to support said racket handle in predetermined angular orientation.

3. The combination carrying case of claim 1, further characterized by a. a plurality of independent carrying means being provided on said carrying case, including a hand grip and a shoulder strap, b. said shoulder strap being removably secured to the sides of said case, c. said case including strap-receiving fasteners on the upper portion of the back thereof, adapted for reception of said strap, and further including strap connecting means adjacent the bottom portion of the back thereof to convert said case to a back pack.

4. The combination carrying case of claim 1, further characterized by a. said clothing case having a width substantially equal to the width of the racket head and a height somewhat greater than that of the racket head, b. the front wall of said clothing case, on the side thereof opposite from said racket case, having a partially detachable upper portion forming an access flap, c. said clothing case being of substantially rectangular configuration, and d. the bottom of said racket case being on the same level as the bottom of said clothing case whereby said combination carrier is substantially self-standing.

*5. A combination carrier for a racket and associated clothing equipment, which comprises*

*(a) a clothing case,*

*(b) a carrying handle at the top of said clothing case,*

*(c) a racket case secured to and extending from one side of said clothing case,*

*(d) said racket case being substantially in the form of an open top pocket having width dimensions generally corresponding to the width of a racket head to be carried therein, and having a height dimension sufficient to accommodate the racket head at least up to its throat area,*

*(e) said pocket having a top opening extending across the full width of said pocket and being contoured to be lower at the ends than in the center thereof,*

*(f) a double zipper closure for said open top, comprising oppositely disposed, independently movable zipper slides on a common zipper track extending continuously across the full width of said contoured top opening,*

*(g) said contoured top opening being so spaced from the bottom of said pocket and so contoured that, when a racket is placed head down in said pocket, said zipper slides may be closed toward said racket to provide support for said racket on both sides, in the general area of the throat and handle thereof.*

*6. A combination carrier according to claim 5, further characterized by*

*(a) said clothing case being of greater height than said racket case, and*

*(b) the bottom of said racket case being on substantially the same level as said clothing case.*

*7. A combination carrying case for a racket and associated clothing equipment, which comprises*

*(a) a clothing case,*

*(b) a carrying handle at the top of said clothing case,*

*(c) a racket case secured to and extending from one side of said clothing case,*

*(d) said racket case being substantially in the form of an open top pocket having width dimensions generally corresponding to the width of a racket head to be carried therein, and having a height dimension generally corresponding to the height of the racket head up to its throat area,*

*(e) said pocket having a top opening extending across the top of said pocket,*

*(f) a single, continuous zipper track extending across the full width of said top opening,*

*(g) a double zipper closure for said top opening, comprising a pair of oppositely disposed, independently movable zipper slides on said continuous zipper track,*

*(h) said top opening being so arranged and spaced from the bottom of said pocket that, when a racket is placed head down in said pocket, said zipper slides may be closed toward said racket to provide support for said racket on both sides, in the general area of the throat and handle thereof, in various angular positions of said racket.*

*8. The combination carrying case of claim 7, further characterized by*

*(a) a plurality of independent carrying means being provided on said carrying case, including a hand grip and a shoulder strap,*

*(b) said shoulder strap being removably secured to the sides of said case,*

*(c) said case including strap-receiving means on the upper portion of the back thereof, adapted for reception of said strap, and further including strap connecting means adjacent the bottom portion of the back thereof to convert said case to a back pack.*

* * * * *